Dec. 27, 1927. 1,653,706
T. M. HOLLAND
PROCESS FOR PRESERVING POLES
Filed March 10, 1927
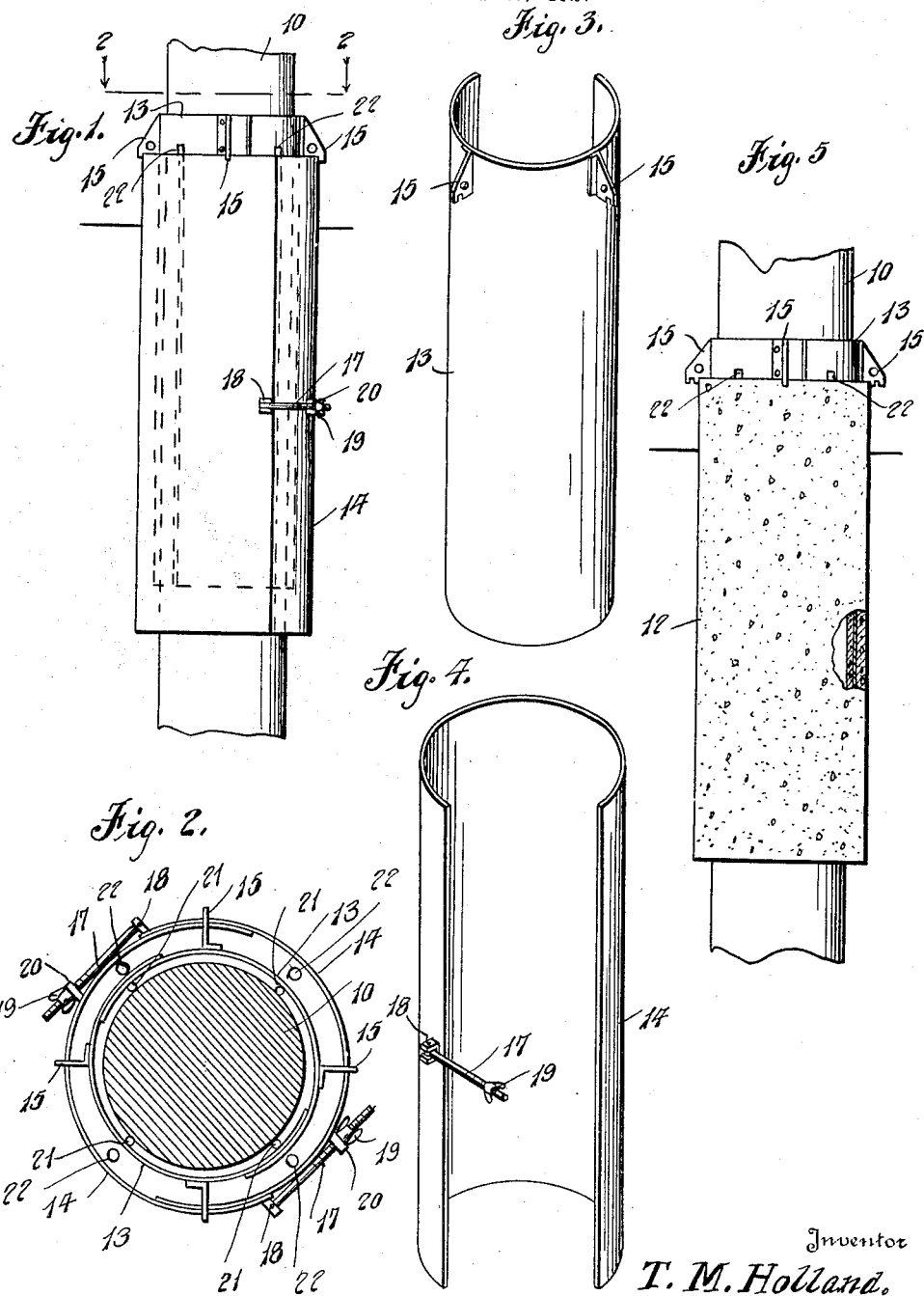
Inventor
T. M. Holland.

Patented Dec. 27, 1927.

1,653,706

UNITED STATES PATENT OFFICE.

THOMAS M. HOLLAND, OF BAKERSFIELD, CALIFORNIA.

PROCESS FOR PRESERVING POLES.

Application filed March 10, 1927. Serial No. 174,249.

This invention relates to an improved process for preserving poles and the principal object of the invention is to provide an improved type of protecting jacket which may be formed about the base portion of the pole and which will preserve the pole from moisture which would cause rotting and which will further protect the pole against exposure to the attack of worms and insects and which will further protect the pole from injury by fire.

Another object of the invention is to so construct the improved jacket that it may be conveniently molded about the pole and to so construct this jacket that it will firmly adhere to the pole and not be liable to be easily broken or otherwise damaged by vehicles striking the jacket.

Another object of the invention is to so construct this jacket that it may include an inner section constituting a preservative for the wood from which the pole is formed and an outer section constituting a reinforcing section.

Another object of the invention is to provide an improved type of mold for forming the jacket, the mold being so constructed that it may be easily put in place and adjusted to the desired size according to the amount of preserving and reinforcing substance it is desired to provide about the pole.

This invention is illustrated in the accompanying drawings wherein:

Figure 1 is a side elevation showing the lower portion of a pole with the mold for forming the improved protecting jacket in place.

Figure 2 is a transverse sectional view through the pole taken along the line 2—2 of Figure 1.

Figure 3 is a perspective view of one of the sections of the inner form.

Figure 4 is a perspective view of one of the sections of the outer form.

Figure 5 is a view partly broken away of the lower portion of the pole with the completed jacket.

This protector is adapted to be used in connection with a pole 10 which may be a telegraph or telephone pole and the principal object is to protect the pole from rotting at the base when it is embedded in the ground or from being damaged by worms or insects which bore into the wood and is further intended to protect the pole from being damaged by the base portion being struck by the wheels of vehicles. It will thus be seen that with this jacket the life of the pole will be greatly lengthened as the base portion will not be weakened.

In forming the jacket there is provided a mold having an inner form spaced from the pole as shown in Figure 2 and an outer form spaced from the inner form thus providing a space between the inner form and pole in which asphalt or a like substance may be placed to act as a preservative for the wood of the pole and a space between the inner mold form and outer mold form in which concrete 12 will be poured and when set form a reinforcing section or coating. This mold has its inner and outer forms constructed of arcuate sections indicated respectively by the numerals 13 and 14 and preferably formed of heavy sheet metal which can be rolled or bent to the desired shape as shown in Figures 3 and 4 and which will have sufficient resiliency so that when put in place and the fasteners to be hereinafter described tightened may be compressed to extend in overlapping relation the desired amount and provide the amount of space desired between the pole and inner form and the inner and outer forms. The sections for the inner mold form carry outstanding arms or spacing brackets 15 which are riveted or otherwise rigidly secured to the sections as shown in Figure 3 and are provided with notches in which the upper edge portion of the outer form sections will fit thus holding the outer sections in the proper spaced relation to the inner mold form. The sections of the outer mold form carry threaded rods 17 which may be termed adjusting screws, the rods being pivotally mounted as shown at 18 and carry wing nuts 19 to engage the cleats 20 when the clamps are swung to the position shown in Figure 2 to draw the overlapping side portions of the outer form into overlapping relation to the desired amount.

When in use, the sections of the inner mold form will be placed about the pole and spacing rods 21 will be placed between the inner mold form and the pole. The outer mold form will then be placed about the inner mold form and the securing rods swung to bring the nuts 19 thereof into engagement with the cleats 20. The nuts can now be turned to tighten the clamps and the sections of the outer mold form will be drawn into overlapping relation until they overlap the desired amount to produce the desired space between the inner and outer mold forms. After these clamps are tightened the sections of the inner mold form will also be compressed due to the engagement between the outer mold form sections and the brackets 15 and the inner mold form will therefore be held in tight engagement with the spacing rods 21. The mold is now in place and ready for use. Hot asphalt or other similar substance which will act as a preservative for the wood is poured into the space between the pole and inner mold form and when hardened will form a very efficient protection for the pole against damage by water, worms or insects which bore into wood. Concrete will be poured into the space between the inner and outer mold forms and when hardened will form a reinforcing structure which will brace the pole and protect it from injury in case a vehicle should run into the pole. As previously stated, this reinforcing will further protect the pole from damage by fire in case grass or other material at the base of the pole should catch on fire. After the asphalt and concrete have set and hardened, the sections forming the outer mold form will be removed, dirt tamped around the concrete and the reinforcement will be ready for use.

It will also be understood that any proved form of metal reinforcement for the concrete section or coating 12, such as designated 22, may be utilized to strengthen it.

What is claimed is:

1. The combination with a pole of a mold positioned about the pole and comprising a mold form having arcuate sections positioned about the pole with their side portions in overlapping relation, rods positioned between the pole and mold form to hold the same in spaced relation to the pole, arms extending from the mold form, asphalt poured into the space between the pole and mold form and allowed to harden therein, and an envelope of concrete surrounding the mold form and allowed to harden.

2. The combination with a pole of a mold form positioned about the pole in spaced relation thereto, hot asphalt poured into the space between the pole and inner mold form and allowed to harden, and an envelope of concrete surrounding the mold form and allowed to harden.

3. The combination with a pole of a mold form positioned about the pole in spaced relation thereto, a wood preservative poured into the space between the pole and the mold form in a heated state and allowed to harden, and a plastic reinforcement surrounding the mold form and allowed to harden.

4. A method of reinforcing and preserving poles consisting of placing a hollow mold structure about a pole, pouring a wood preservative into the space between the mold and pole and allowing the same to harden about the pole, and pouring a plastic into the interior of the hollow mold and allowing the same to harden.

5. A method of preserving and reinforcing a pole base consisting of placing a mold about the base portion of the pole in spaced relation to the same, pouring heated asphalt into the space between the mold and pole and allowing the same to harden, and pouring a plastic reinforcing material into the hollow mold and allowing the same to harden.

6. A mold for the purpose described comprising an inner mold form having sheet metal sections positioned vertically with their side portions in overlapping relation, arms extending from the inner mold form sections and having notches adjacent their outer ends, an outer mold form having sheet metal sections extending vertically with their upper edge portions fitting into the notches of said arms and having their side portions extending in overlapping relation, cleats carried by the sections of the outer mold form, and threaded rods pivotally connected with the sections of the outer mold form and having nuts screwed thereon for engaging said cleats.

7. A mold for the purpose described comprising an inner mold form and an outer mold form, each having sections of yieldable material extending vertically with their side portions in overlapping relation, arms extending from the sections of the inner mold form and engaging the sections of the outer mold form to retain the forms in spaced relation, and clamping means releasably connecting the sections of the outer mold form to retain the same in overlaping relation, the outer mold form when compressed compressing the sections of the inner mold form through the medium of said arms.

8. A mold for the purpose described comprising an inner mold form and an outer mold form positioned in spaced relation to the inner mold form and each formed of a plurality of vertically extending sections arcuate transversely and having their side portions extending in overlapping relation, means for retaining the outer mold form in spaced relation to the inner mold, and means for retaining the sections of the outer mold form in overlapping relation, the outer mold form through the medium of said spacing means retaining the sections of the inner mold form in spaced relation.

In testimony whereof I affix my signature.

THOMAS M. HOLLAND.